(12) United States Patent
Kobayashi

(10) Patent No.: US 9,983,540 B2
(45) Date of Patent: May 29, 2018

(54) IMAGE FORMING APPARATUS PROVIDED WITH A MAIN BODY-SIDE SUBSTRATE TO WHICH AN ELECTRICAL COMPONENT IS MOUNTABLE

(71) Applicant: KYOCERA Document Solutions Inc., Osaka (JP)

(72) Inventor: Tatsuya Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/661,760

(22) Filed: Jul. 27, 2017

(65) Prior Publication Data

US 2018/0052418 A1    Feb. 22, 2018

(30) Foreign Application Priority Data

Aug. 18, 2016  (JP) .................................. 2016-160795

(51) Int. Cl.
*G03G 21/16*     (2006.01)
*H04N 1/00*      (2006.01)

(52) U.S. Cl.
CPC ..... *G03G 21/1619* (2013.01); *H04N 1/00551* (2013.01); *H04N 1/00557* (2013.01)

(58) Field of Classification Search
CPC .......... G03G 21/1619; H04N 1/00557; H04N 1/00551

USPC ......................................................... 399/107
See application file for complete search history.

(56) References Cited

U.S. PATENT DOCUMENTS

| | | | |
|---|---|---|---|
| 2003/0048622 A1* | 3/2003 | Kim ......................... | G06F 1/181 361/796 |
| 2008/0107441 A1* | 5/2008 | Tanaka ................ | G03G 15/0863 399/83 |
| 2015/0063863 A1* | 3/2015 | Koyanagi ............ | H05K 9/0049 399/107 |

FOREIGN PATENT DOCUMENTS

JP            10-133443 A       5/1998

* cited by examiner

*Primary Examiner* — Billy Lactaoen
(74) *Attorney, Agent, or Firm* — Stein IP, LLC

(57) ABSTRACT

An image forming apparatus of the present disclosure is provided with a main body-side substrate, a cover member, a metallic main body frame, and a metallic thumbscrew. The main body-side substrate is provided in a main body of the image forming apparatus, and an electrical component is mountable thereto. The cover member covers an outer side of the main body-side substrate. The cover member is secured to the main body frame. The thumbscrew is used to secure the cover member to the main body frame. The cover member is demounted from the main body frame by unscrewing the thumbscrew, and thus mounting of the electrical component with respect to the main body-side substrate is enabled.

9 Claims, 5 Drawing Sheets

IMAGE FORMING APPARATUS PROVIDED WITH A MAIN BODY-SIDE SUBSTRATE TO WHICH AN ELECTRICAL COMPONENT IS MOUNTABLE

INCORPORATION BY REFERENCE

This application is based upon and claims the benefit of priority from the corresponding Japanese Patent Application No. 2016-160795 filed on Aug. 18, 2016, the entire contents of which are incorporated herein by reference.

BACKGROUND

The present disclosure relates to an image forming apparatus and particularly relates to an image forming apparatus that is provided with a main body-side substrate to which an electrical component is mountable.

An image forming apparatus such as a multi-functional peripheral can be provided additionally with a wireless communication function, a facsimile function, or the like as an option. Adding such an optional function requires that an electrical component as an optional component be mounted to a main body-side substrate of a main body of the image forming apparatus. Mounting of the optional component in the image forming apparatus is performed by an installer or a user at the time of installing the image forming apparatus or after the start of using the image forming apparatus.

SUMMARY

An image forming apparatus according to a first configuration of the present disclosure is provided with a main body-side substrate, a cover member, a metallic main body frame, and a metallic thumbscrew. The main body-side substrate is provided in a main body of the image forming apparatus, and an electrical component is mountable thereto. The cover member covers an outer side of the main body-side substrate. The cover member is secured to the main body frame. The thumbscrew is used to secure the cover member to the main body frame. The cover member is demounted from the main body frame by unscrewing the thumbscrew, and thus mounting of the electrical component with respect to the main body-side substrate is enabled.

Still other objects of the present disclosure and specific advantages provided by the present disclosure will be made further apparent from the following description of an embodiment.

DETAILED DESCRIPTION

With reference to the appended drawings, the following describes an embodiment of the present disclosure.

Figure 1:
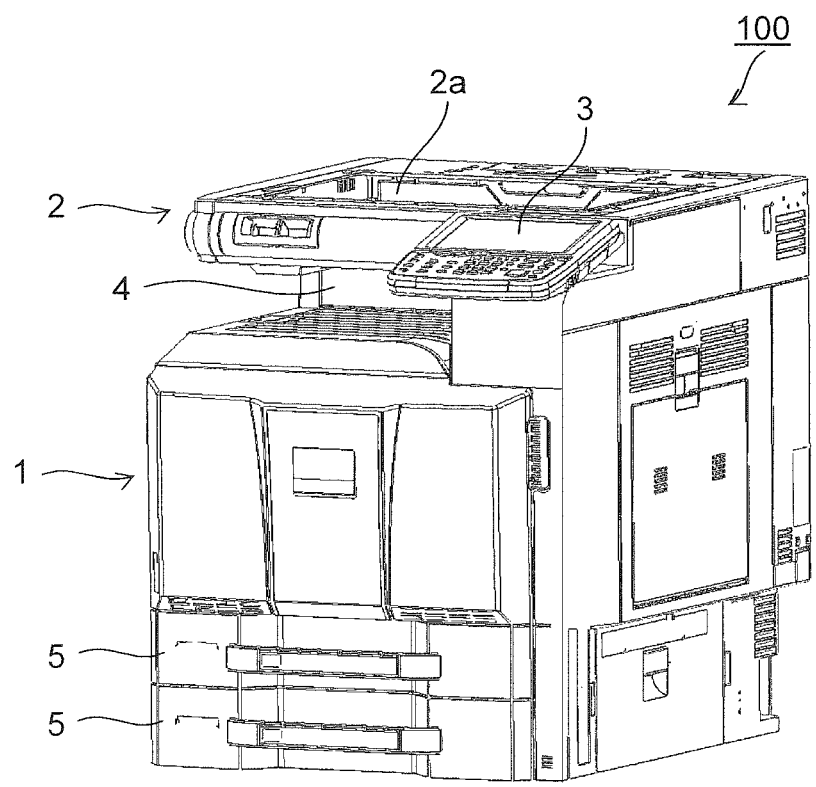
FIG. 1 is a view showing a structure of an image forming apparatus according to one embodiment of the present disclosure.

With reference to FIG. 1 to FIG. 8, a description is given of an image forming apparatus 100 according to one embodiment of the present disclosure. As shown in FIG. 1, the image forming apparatus 100 (herein, a digital multi-functional peripheral is shown as one example) is provided with an apparatus main body (an image forming apparatus main body) 1 and an image reading device 2 that is arranged above the apparatus main body 1.

In a front portion of the image reading device 2, an operation panel 3 having operation buttons and a display portion is provided. Above the image reading device 2, a platen 6 (see FIG. 2) that presses an original document placed on a contact glass 2a is openably/closably provided, and on the platen 6, there is additionally provided an original document conveyance device 7 (see FIG. 2) that automatically conveys an original document to the image reading device 2. In FIG. 1, depictions of the platen 6 and the original document conveyance device 7 are omitted.

Between the image reading device 2 and the apparatus main body 1, there is provided an intra-body paper ejection space 4 that is largely open toward a left side surface and a front.

In a front portion of the apparatus main body 1, a paper feed cassette 5 in which paper sheets (recording media) are housed is provided so as to be mountable/demountable with respect to the apparatus main body 1.

Inside the apparatus main body 1, there are provided an image forming portion, a fixing portion, a paper sheet conveyance portion, and so on, which are unshown. Based on image data read by the image reading device 2, the image forming portion transfers a toner image on a paper sheet fed thereto, thus forming an image on the paper sheet. The image forming portion includes a photosensitive drum that carries an electrostatic latent image, a charging unit that charges a surface of the photosensitive drum, an exposure unit that uses a laser beam or the like to form an electrostatic latent image corresponding to an original document image on the surface of the photosensitive drum, a developing unit that causes a developer to adhere to the thus formed electrostatic latent image, thus forming a toner image, a transfer roller that transfers the toner image on a paper sheet, a cleaning blade that removes residual toner on the surface of the photosensitive drum, and so on. Furthermore, the fixing portion heats and presses the paper sheet on which the toner image has been transferred so that the toner image is fixed on the paper sheet. The paper sheet conveyance portion conveys a paper sheet from the paper feed cassette 5 to the image forming portion.

Next, a description is given of a structure of a rear surface 1a of the apparatus main body 1.

Figure 2:
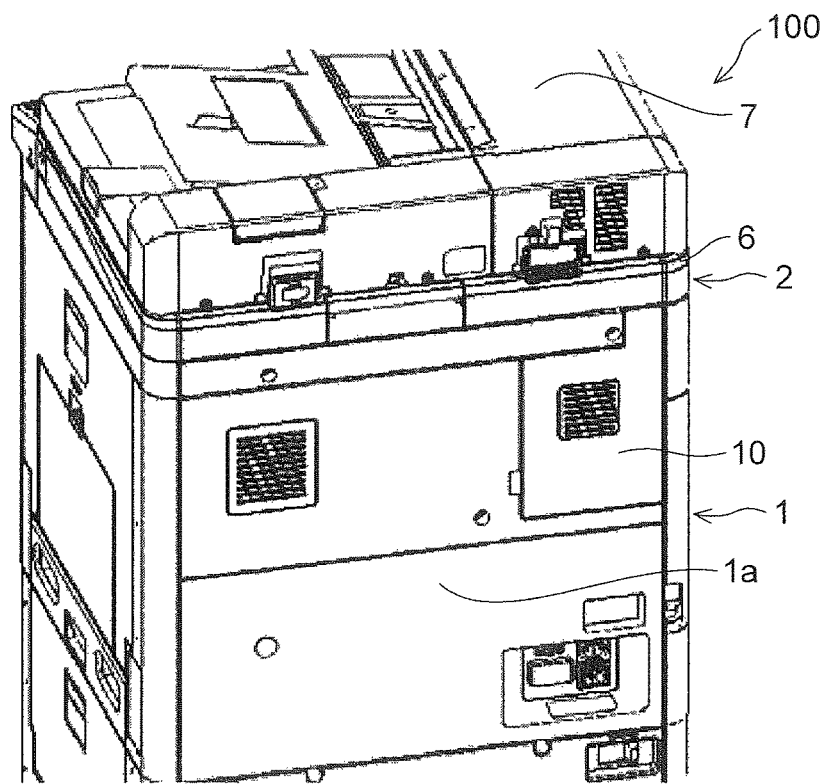
FIG. 2 is a view showing, from a rear surface side, the structure of the image forming apparatus according to one embodiment of the present disclosure.
Figure 3:
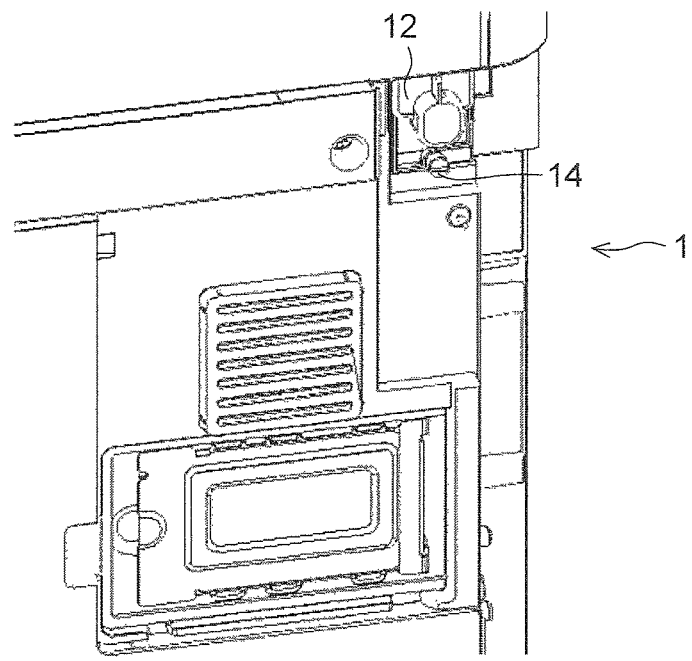
FIG. 3 is a view showing a structure of a periphery of a cover member of the image forming apparatus according to one embodiment of the present disclosure.

As shown in FIG. 2, at a prescribed portion of the rear surface 1a of the apparatus main body 1, an outer side cover member 10 is provided that is mountable/demountable with respect to the apparatus main body 1 and constitutes a part of an exterior cover. On an apparatus inner side of the outer side cover member 10, as shown in FIG. 3 and FIG. 4, there are provided a resinous cover member 12 that covers an outer side of a main body-side substrate 11 (see FIG. 5) secured to the apparatus main body 1, a main body frame 13 (see FIG. 5) to which the cover member 12 is secured, and a metallic thumbscrew (referred to also as a hand screw or a hand-tightening screw) 14 for securing the cover member 12 to the main body frame 13.

Figure 5:
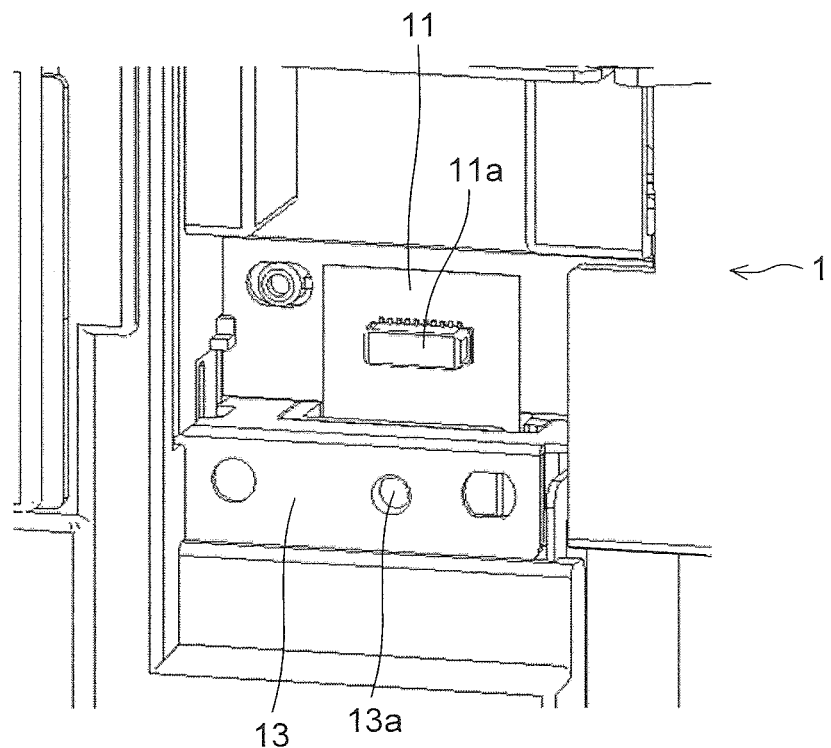
FIG. 5 is a view showing a structure of a periphery of a main body-side substrate of the image forming apparatus according to one embodiment of the present disclosure.

As shown in FIG. 5, the main body-side substrate 11 is provided in the apparatus main body 1, and an electrical component 20 (see FIG. 6) as an optional component is mountable to the main body-side substrate 11. In the main body-side substrate 11, a first connector 11a to/from which the electrical component 20 is mountable/demountable is provided toward an apparatus outer side (a rear surface side).

Figure 4:
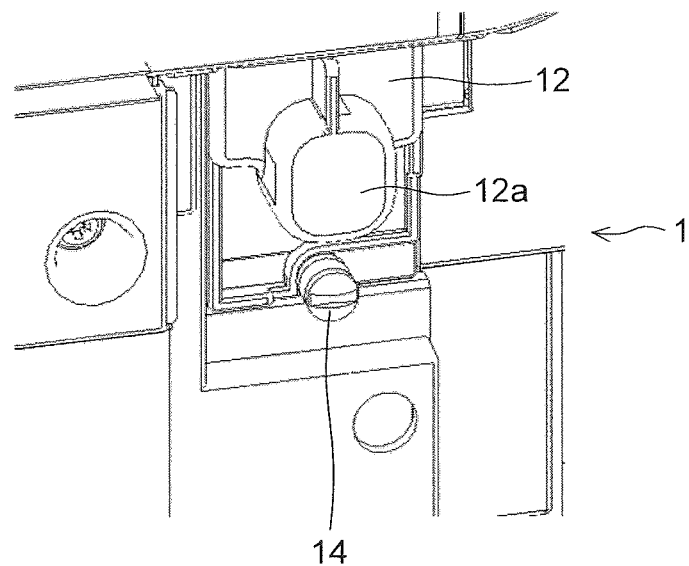
FIG. 4 is a view showing a structure of the periphery of the cover member of the image forming apparatus according to one embodiment of the present disclosure.
Figure 6:
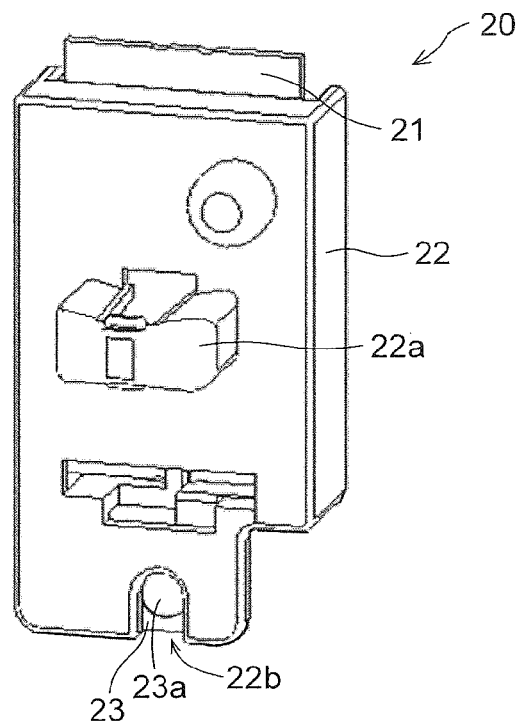
FIG. 6 is a view showing a structure of an electrical component to be mounted in the image forming apparatus according to one embodiment of the present disclosure.
Figure 7:
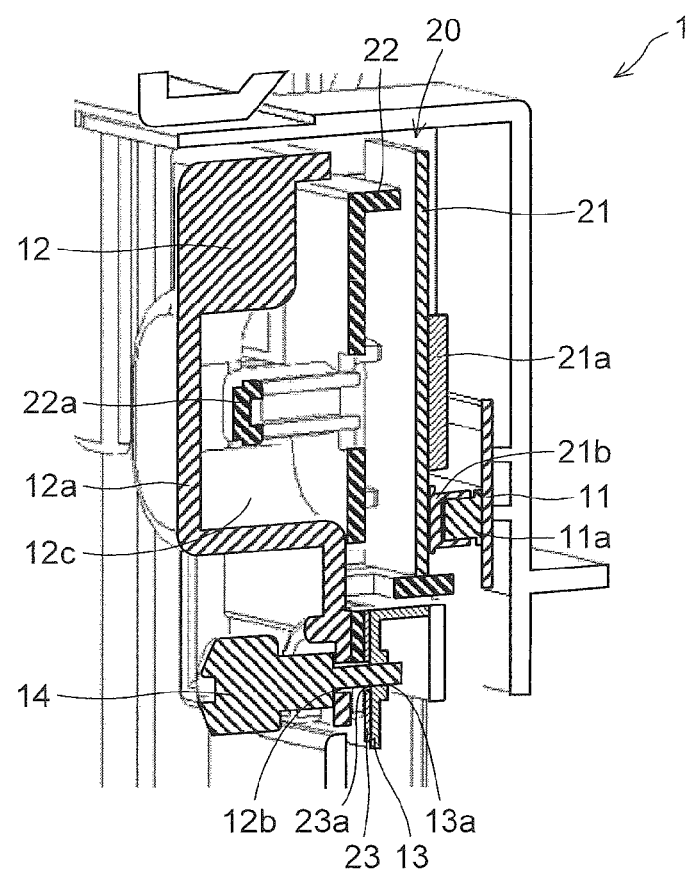
FIG. 7 is a view showing a state where the electrical component is mounted in the image forming apparatus according to one embodiment of the present disclosure.

As shown in FIG. 4 and FIG. 7, the cover member 12 has a protrusion portion 12a that protrudes to the apparatus outer side and is grasped by a user or the like and an insertion hole 12b into which the thumbscrew 14 is inserted. In the protrusion portion 12a, there is formed a concave portion 12c (see FIG. 7) for avoiding touching a grasp portion 22a (see FIG. 6) of an after-mentioned holding member 22 of the electrical component 20. As shown in FIG. 5 and FIG. 7, a screw hole 13a for mounting the thumbscrew 14 therethrough is formed through the main body frame 13.

The electrical component 20 is mounted in the apparatus main body 1 by a user mainly after the start of using the image forming apparatus 100. As shown in FIG. 6 and FIG. 7, the electrical component 20 is composed of a circuit substrate 21, the resinous holding member 22 that holds the circuit substrate 21, and a metallic ground plate 23 that is secured to the holding member 22 and electrically connected to a ground terminal of the circuit substrate 21.

The circuit substrate 21 is a circuit substrate for wireless communication and includes an IC chip 21a, an antenna (not shown) that is electrically connected to the IC chip 21a, and a second connector 21b that is electrically connected to the IC chip 21a.

In the holding member 22, the grasp portion 22a is provided to be grasped by a user or the like, which protrudes to an opposite side to the main body-side substrate 11 in a state where the electrical component 20 is mounted to the main body-side substrate 11. Furthermore, in a lower portion of the holding member 22, there is provided a cutout 22b into which the thumbscrew 14 is inserted. Instead of the cutout 22b, an insertion hole may be provided through the holding member 22.

In a lower portion of the ground plate 23, there is provided an insertion hole 23a into which the thumbscrew 14 is inserted. Instead of the insertion hole 23a, a cutout may be provided in the ground plate 23.

In the image forming apparatus 100, at the time of product shipping (immediately after manufacturing), the electrical component 20 has not yet been mounted in the apparatus main body 1, and the cover member 12, in a state of covering the outer side of the main body-side substrate 11, has been mounted to the main body frame 13 by using the thumbscrew 14. For this reason, unless the cover member 12 is demounted from the main body frame 13 by unscrewing the thumbscrew 14, the electrical component 20 cannot be mounted to the main body-side substrate 11, and a user or the like cannot touch the main body-side substrate 11. In a state where the thumbscrew 14 is mounted through the screw hole 13a of the main body frame 13, the thumbscrew 14 is electrically connected to the main body frame 13 and has a ground potential.

In a case where, after the start of using the image forming apparatus 100, the electrical component 20 is mounted in the apparatus main body 1 by a user (or an installer when the image forming apparatus 100 is installed at a prescribed position), first, from a state shown in FIG. 2, the outer side cover member 10 is demounted from the apparatus main body 1. Then, from a state shown in FIG. 3 and FIG. 4, the thumbscrew 14 is unscrewed and removed from the main body frame 13, and the cover member 12 is demounted from the main body frame 13, so that, as shown in FIG. 5, mounting of the electrical component 20 with respect to the main body-side substrate 11 is enabled. When the user touches the thumbscrew 14, an electrical charge in a body of the user is discharged to the main body frame 13.

Figure 8:
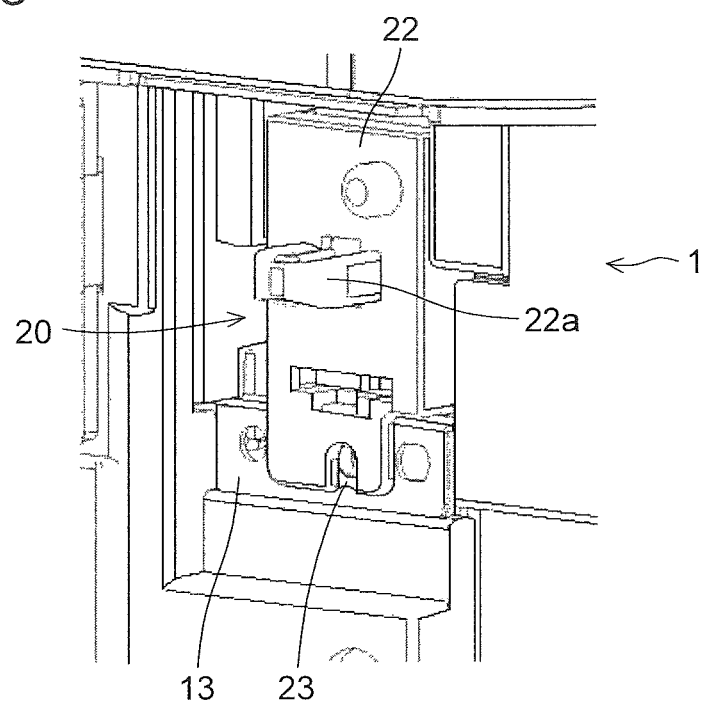
FIG. 8 is a view showing a state where the electrical component is mounted to the main body-side substrate of the image forming apparatus according to one embodiment of the present disclosure.

After that, while the grasp portion 22a of the holding member 22 of the electrical component 20 is being grasped, the second connector 21b of the circuit substrate 21 is mounted to the first connector 11a of the main body-side substrate 11, and thus a state shown in FIG. 8 is established. Then, in a state where, as shown in FIG. 7, the cover member 12 is disposed so as to cover an outer side of the electrical component 20, the thumbscrew 14 is inserted through the insertion hole 12b of the cover member 12, the cutout 22b of the holding member 22, and the insertion hole 23a of the ground plate 23 and fastened into the screw hole 13a of the main body frame 13. At this time, the electrical component 20 and the cover member 12 are fastened to the main body frame 13 by co-fastening using the thumbscrew 14. Furthermore, at this time, the ground plate 23 is sandwiched between the holding member 22 and the main body frame 13 and pressed by the holding member 22 against the main body frame 13. Further, the circuit substrate 21 is ground-connected to the main body frame 13 via the ground plate 23.

After that, as shown in FIG. 2, the outer side cover member 10 is mounted with respect to the apparatus main body 1, which completes an operation of mounting the electrical component 20 with respect to the apparatus main body 1.

In this embodiment, as described above, the cover member 12 is demounted from the main body frame 13 by unscrewing the thumbscrew 14, and thus mounting of the electrical component 20 with respect to the main body-side substrate 11 is enabled. By this configuration, when a user or the like touches the thumbscrew 14 in order to mount the electrical component 20 to the main body-side substrate 11, an electrical charge in a body of the user or the like is discharged to the main body frame 13. Thus, even when the user or the like thereafter touches the main body-side substrate 11, it is possible to suppress a phenomenon in which the main body-side substrate 11 is electrically damaged due to static electricity.

Furthermore, as described above, in a state where the electrical component 20 is mounted to the main body-side substrate 11 and to the main body frame 13, the electrical component 20 and the cover member 12 are fastened to the main body frame 13 by co-fastening using the thumbscrew 14. Thus, the electrical component 20 can be readily fastened to the main body frame 13.

Furthermore, as described above, in a case where the electrical component 20 including the circuit substrate 21 for wireless communication is mounted in the apparatus main body 1, a mounting operation is often performed by a user. It is, therefore, particularly effective to apply the present disclosure to such a case.

Furthermore, as described above, the electrical component 20 includes the holding member 22 that holds the circuit substrate 21. This can suppress the circuit substrate 21 being touched by a user or the like, thus being able to suppress a phenomenon in which the circuit substrate 21 is electrically damaged due to static electricity.

Furthermore, as described above, in a state where the electrical component 20 is mounted to the main body-side substrate 11 and to the main body frame 13, the ground plate 23 is sandwiched between the holding member 22 and the main body frame 13, and the circuit substrate 21 is ground-connected to the main body frame 13 via the ground plate 23. Thus, the circuit substrate 21 can be readily ground-connected to the main body frame 13.

Furthermore, as described above, the grasp portion 22a is provided at a portion of the holding member 22 on an opposite side to the main body-side substrate 11. Thus, workability in mounting the electrical component 20 can be improved.

Furthermore, as described above, the outer side cover member 10 is provided that covers an outer side of the cover member 12. This can suppress the main body-side substrate 11 and the cover member 12 being touched by a user, thus being able to suppress dust or the like adhering to the main body-side substrate 11.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

For example, while there has been shown an example in which the present disclosure is applied to a multi-functional peripheral, the present disclosure is not limited thereto but applicable to various types of image forming apparatuses each provided with a main body-side substrate to which an electrical component is mountable, such as a copy machine, a printer, and a facsimile.

Furthermore, while the above-described embodiment has shown an example in which the electrical component 20 including the circuit substrate 21 for wireless communication is used as an electrical component, the present disclosure is not limited thereto, and electrical components such as an apparatus controlling substrate, an image processing substrate, a facsimile function extension unit, and a hard disk unit may also be used.

Furthermore, while the above-described embodiment has shown an example in which demounting of the cover member 12 from the main body frame 13 is enabled by removing the thumbscrew 14 from the main body frame 13, the present disclosure is not limited thereto. For example, a configuration may be adopted in which, in place of the insertion hole 23a, a cutout is provided in the ground plate 23, and demounting of the cover member 12 from the main body frame 13 is enabled by loosening the thumbscrew 14.

Furthermore, while the above-described embodiment has shown an example in which the cover member 12 is fastened to the main body frame 13 after the circuit substrate 21 has been mounted to the main body-side substrate 11, a configuration may also be adopted in which the cover member 12 is not fastened to the main body frame 13 after the circuit substrate 21 has been mounted to the main body-side substrate 11.

What is claimed is:

1. An image forming apparatus comprising:
   a main body-side substrate that is provided in a main body of the image forming apparatus and to which an electrical component is mountable;
   a cover member that covers an outer side of the main body-side substrate;
   a metallic main body frame to which the cover member is secured; and
   a metallic thumbscrew for securing the cover member to the main body frame,
   wherein
   the electrical component includes a circuit substrate, a holding member that holds the circuit substrate, and a ground plate that is held by the holding member,
   the cover member is demounted from the main body frame by unscrewing the thumbscrew, and thus mounting of the electrical component with respect to the main body-side substrate is enabled,
   in a state where the electrical component is mounted to the main body-side substrate, the ground plate is sandwiched between the holding member and the main body frame, and the circuit substrate is ground-connected to the main body frame via the ground plate, and
   in a lower portion of the ground plate, there is provided an insertion hole into which the thumbscrew is inserted.

2. The image forming apparatus according to claim 1, wherein in a state where the electrical component is mounted to the main body-side substrate, the electrical component and the cover member are secured to the main body frame by co-fastening using the thumbscrew.

3. The image forming apparatus according to claim 1, wherein the circuit substrate is a circuit substrate for wireless communication.

4. The image forming apparatus according to claim 1, wherein a grasp portion is provided at a portion of the holding member on an opposite side to the main body-side substrate.

5. The image forming apparatus according to claim 1, further comprising an outer side cover member that covers an outer side of the cover member.

6. The image forming apparatus according to claim 1, wherein the main body-side substrate is arranged inside the main body frame.

7. The image forming apparatus according to claim 1, wherein
   one surface of the circuit substrate faces the main body-side substrate, and
   another surface of the circuit substrate faces the cover member.

8. The image forming apparatus according to claim 1, wherein
   in the main body-side substrate, a first connector to/from which the electrical component 20 is mountable/demountable is provided toward an apparatus outer side,
   the circuit substrate includes an IC chip and a second connector that is electrically connected to the IC chip, and
   the second connector is mounted to the first connector.

9. The image forming apparatus according to claim 8, wherein
   the IC chip and the second connector face the main body-side substrate.

* * * * *